No. 888,392. PATENTED MAY 19, 1908.
R. W. DOUGLASS.
BALANCER SET.
APPLICATION FILED OCT. 1, 1904.

Witnesses:
George H. Tilden.
Helen Oxford

Inventor:
Richard W. Douglass,
by Albert G. Davis
Att'y.

UNITED STATES PATENT OFFICE.

RICHARD W. DOUGLASS, OF LYNN, MASSACHUSETTS, ASSIGNOR TO GENERAL ELECTRIC COMPANY, A CORPORATION OF NEW YORK.

BALANCER SET.

No. 888,392.   Specification of Letters Patent.   Patented May 19, 1908.

Application filed October 1, 1904. Serial No. 226,752.

*To all whom it may concern:*

Be it known that I, RICHARD W. DOUGLASS, a citizen of the United States, residing at Lynn, county of Essex, State of Massachusetts, have invented certain new and useful Improvements in Balancer Sets, of which the following is a specification.

This invention relates to systems of electrical distribution of the well known two-wire three-wire type in which compensating machines are used to balance the load between the two main conductors and the neutral wire of the three-wire circuit. In such systems the armatures of the two compensating machines are ordinarily connected in series between the two main conductors, and the neutral wire is connected to a point between the two armatures. The machines are direct connected and when the system is perfectly balanced both machines run as motors, taking from the line only sufficient current to overcome the friction and other losses of the machines. If, however, the three-wire system becomes unbalanced because of the increase in load between either of the main conductors and the neutral wire, thereby lowering the voltage on that leg of the system, the machine connected across that leg no longer runs as a motor, for the counter-electromotive force then equals or exceeds the impressed electromotive force and the losses of the two machines are supplied by power from the other leg of the system. With a still further over-loading the compensating machine will operate as a generator supplying current to the over-loaded leg of the system, being driven by the machine connected to the leg having the light load.

It is the object of the present invention to provide an arrangement of the shunt fields and parts allied therewith whereby an increased flexibility of adjustment of the machine voltages is secured together with certain other advantages more specifically pointed out in the following description and claims.

Figure 1:
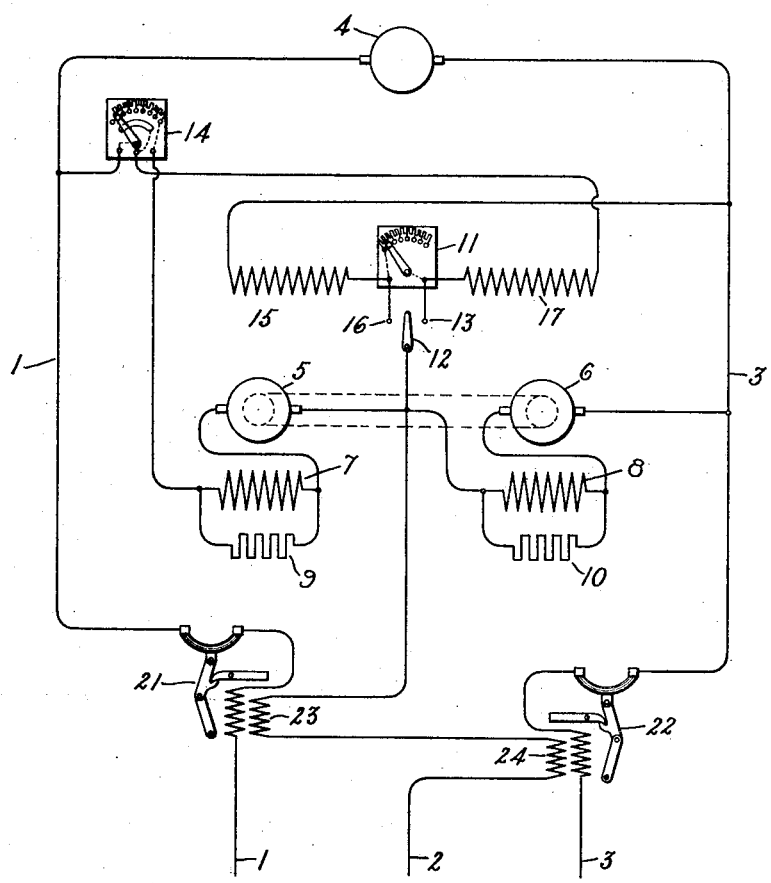
Figure 2:
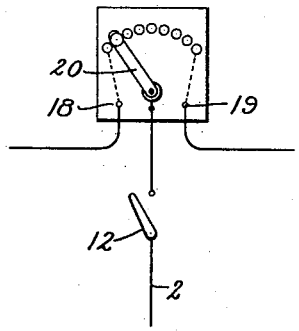

In the drawing, Figure 1 shows the general arrangement of the system, and Fig. 2 is a special form of rheostat which may be used in place of the one shown in Fig. 1.

The distributing mains 1 and 3 of the three-wire system are supplied by power from the generator 4. The compensating machines 5 and 6 are connected in series between the outside wires 1 and 3 through the starting box 14, which may be of the ordinary construction in which the first step of the rheostat closes the field circuit to give the motor full field, the second step closes the armature circuit through the starting resistance and subequent steps cut out portions of the starting resistance. The neutral wire 2 is connected to the conductor joining the armatures of the machines 5 and 6. These machines are provided respectively with the series fields 7 and 8 and the series field shunts 9 and 10.

The shunt fields of the two machines are connected in series across the two outside wires 1 and 3, and a field rheostat 11 is included in this shunt field circuit. A switch 12 is connected to the neutral wire 2 in such a manner that the neutral wire may be connected to the shunt field circuit on either side of the field rheostat 11, thereby throwing the rheostat from one shunt field to the other as circumstances may require. Thus if switch 12 is thrown to the right, making contact with the stud 13, the rheostat 11 will be included in the shunt field 15; while if the switch is turned to the left, making contact with stud 16, the rheostat will be in circuit with the shunt field 17.

In starting up the compensating machines it is desirable to have switch 12 open, for otherwise the current flowing through the shunt field 17 will pass through the series field 8 and armature 6 instead of continuing through the shunt field 15, thereby leaving field 15 unexcited and subjecting the other field to substantially full line voltage or practically double its normal voltage. This is of course due to the fact that at starting there is no counter electromotive force across the armature 6 and hence the impedance to the flow of current through this armature is very much less than the impedance to the flow through the field winding 15 with the result that practically all current is shunted from the field 15. After the machines are up to speed the switch 12 may be closed, and it may subsequently be changed at will from one contact point to the other, as the reactance of the shunt fields prevents any substantial fluctuation in the voltages of the compensating machines while the change from one contact to the other is being made.

The arrangement above described permits rheostat 11 to be shifted from one shunt field to the other so that the same resistance may be used alternately in the shunt circuits to weaken each one in turn. This arrangement has special advantages as it permits the use of a single rheostat for two shunt fields, thus decreasing the cost of the installation for it will be seen that when one rheostat has been turned all in to weaken one shunt field there is no necessity in having a rheostat on the other side, for to gain the greatest effect it would have to be turned all out. A second advantage arises from the simplicity of the system and the ease with which adjustments of the two machines may be effected. When two rheostats are used they might, through inadvertance, be turned completely in, thus weakening both fields at the same time, and although securing the desired compounding of the two machines would do so at the expense of the commutation factor. With the present arrangement, however, one or the other of the fields is of necessity operating on full voltage, and good commutation is secured.

In the rheostat shown in Fig. 2, the resistance is connected between the terminals 18 and 19 and the controlling lever 20 makes contact at various points throughout the length of the resistance, the lever 20 being connected to the neutral wire 2 through the switch 12. When this form of rheostat is used in place of the one shown in Fig. 1, all of the resistance will be in series with the shunt fields when the switch 12 is open, but when the switch is closed the proportion of the resistance in circuit with each shunt field will depend upon the position of the lever 20, thus affording a means for simultaneously varying both shunt fields. Circuit breakers 21 and 22 are provided in the line wires 1 and 3 and in addition to the usual tripping coil they are provided respectively with auxiliary tripping coils 23 and 24 in series with the neutral wire. With this arrangement an excessive current in the neutral wire will serve to open both circuit breakers, thereby protecting from excessive current the compensating machines and the translating devices supplied by the system.

What I claim as new and desire to secure by Letters Patent of the United States, is:

1. In an electrical system, the combination of distributing mains, compensating machines connected across said mains and to a neutral conductor, a shunt field for each machine, a resistance device, and means for including said resistance device in either shunt field circuit.

2. In an electrical system, the combination of distributing mains, compensating machines connected across said mains and to a neutral conductor, a shunt field for each machine, means for connecting said shunt fields to said neutral conductor, a resistance, and means for including said resistance in either shunt field circuit.

3. In an electrical system, the combination of distributing mains, compensating machines connected across said mains and to a neutral conductor, shunt fields for said machines connected in series through a resistance device, and means for connecting said neutral conductor to said shunt field circuit on either side of said resistance device.

4. In an electrical system, the combination of distributing mains, compensating machines connected across said mains and to a neutral conductor, shunt fields for said machines connected in series through a resistance device, and means for connecting said neutral conductor to said shunt field circuit at intermediate points along said resistance device.

5. In an electrical system, the combination of distributing mains, compensating machines connected across said mains and to a neutral conductor, shunt fields connected in series through a resistance device, and means for simultaneously varying the resistance between said neutral conductor and each of said shunt fields.

6. In an electrical system, the combination of distributing mains, compensating machines connected across said mains and to a neutral conductor, shunt fields for said machines connected in series through a resistance device, and means for varying the proportion of said device traversed by the respective shunt field currents.

In witness whereof I have hereunto set my hand this 28th day of September, 1904.

RICHARD W. DOUGLASS.

Witnesses:
JOHN A. McMANUS, Jr.,
DUGALD McK. McKILLOP.